April 16, 1968  G. V. MOMMSEN ET AL  3,377,984

AIRFLOW MANDREL

Filed March 25, 1963

INVENTORS
GORDON V. MOMMSEN
BY MELVIN J. STRAUB

Moore, White & Burd
ATTORNEYS

United States Patent Office 3,377,984
Patented Apr. 16, 1968

3,377,984
AIRFLOW MANDREL
Gordon V. Mommsen, Minneapolis, and Melvin J. Straub, Hopkins, Minn., assignors to Possis Machine Corporation, Minneapolis, Minn., a corporation of Minnesota
Filed Mar. 25, 1963, Ser. No. 267,576
6 Claims. (Cl. 118—69)

This invention is a mandrel for a coating machine of the type in which powdered resins are directed at a heated part which is supported on a mandrel. The mandrel is novel in being hollow and perforated on at least a portion of its surface adjacent to the part it supports. Air is supplied under controlled pressure to produce adiabatic expansion so that there is a flow of air from the mandrel surface out past the device being supported thereon whenever the machine is functioning.

One of the basic problems with machines of the type in which heated parts are sprayed with thermosetting resin powder which melts upon engaging the heated part and forms a plastic coating thereon is that the supporting structure such as a mandrel for the part tends also to become heated as the result of contact with the part which results eventually in the mandrel beginning to accept some of the powdered resin forming a coating thereon. For this reason, the mandrels get dirty or covered with the resin which inhibits smooth placement and removal of additional devices on the mandrel. Accordingly, the mandrel has to be cleaned which is time consuming and therefore costly. Additionally, there are usually portions of the device being coated which is desired to keep free the resin coating. The mandrels previously employed permitted undesirable deposits of resin on the part, and the coating has not been controlled as well as could be desired.

Accordingly, it is a principal object of this invention to provide a novel mandrel for coating machines.

It is a further object of this invention to provide a mandrel for coating machines in which the mandrel is perforated, hollow and connected to a hollow shaft through which a controlled supply of air is applied.

Another object of this invention is to provide a mandrel which tends to resist a deposit of thermosetting resin powder thereon.

It is a further object of this invention to provide a mandrel which is constantly cooled by adiabatic expansion of the air.

It is a further object of this invention to provide an apparatus for minimizing deposits of resin on portions of an object to be coated where it is desired to avoid resin coating.

Other and further objects of the invention are those inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention will be described with reference to the drawings in which coresponding numerals refer to the same parts and in which.

Figure 2:
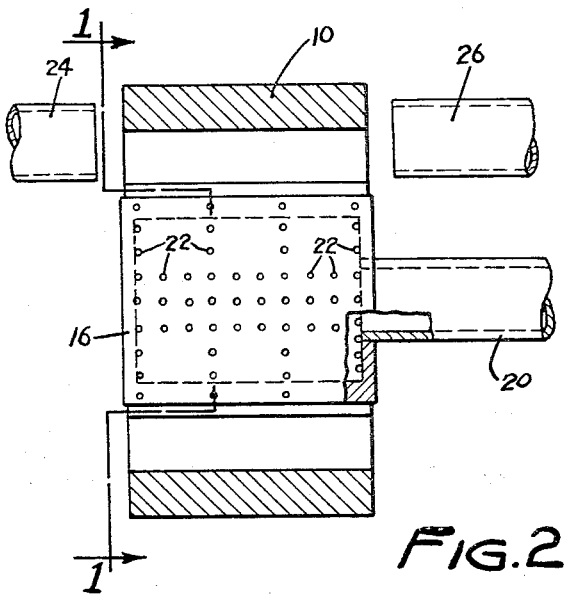
FIGURE 2 is a partial section, partial side elevation of the work piece and mandrel shown in FIGURE 1 and taken on the line and in the direction of the arrows 2—2 of FIGURE 1; broken lines show hidden parts and part of the mandrel is broken away to show internal construction.
Figure 3:
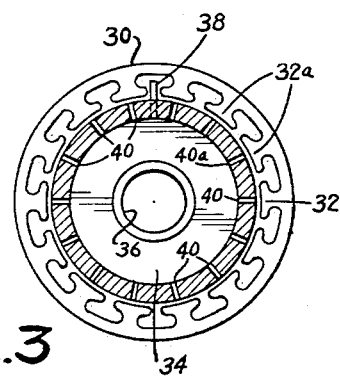
FIGURE 3 is a sectional view similar to FIGURE 1 of a different form of a work piece and mandrel, it is taken on the line and in the direction of the arrows 3—3 of FIGURE 4.
Figure 4:
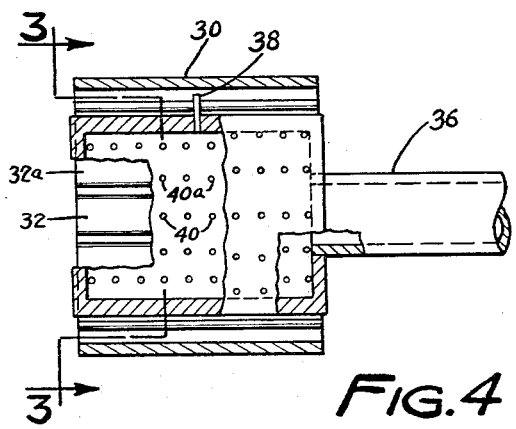
Figure 5:
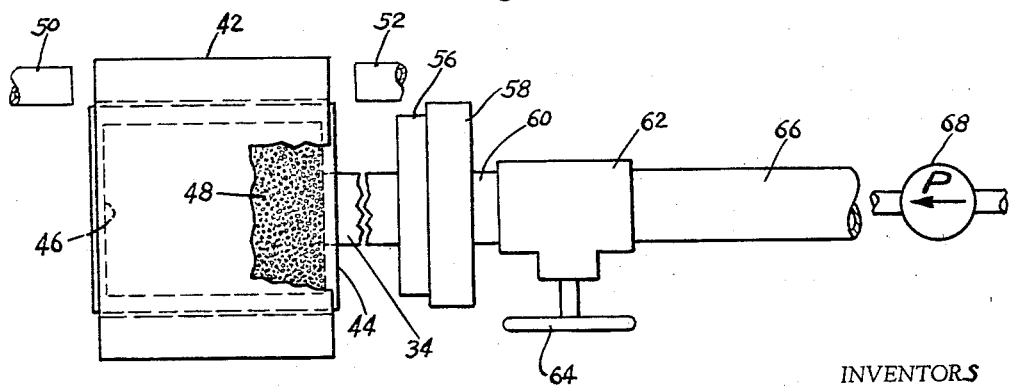

FIGURE 4 is a view similar to FIGURE 2 but with relation to the structure shown in FIGURE 3 and with portions of the mandrel broken away to illustrate internal construction; broken lines show hidden parts; and FIGURE 5 is a side elevation of a further modification of the mandrel supporting a work piece with a diagrammatic representation of the pumping and control system for regulating air pressure inside the mandrel; portions of the system are deleted to conserve space and a part of the work piece is broken away to illustrate the surface of the mandrel.

While this system of controlling the application of thermosetting resin powder to work pieces may be applicable in other instances, a very satisfactory and particularly useful application of it relates to coating certain portions of electrical machines and specifically the coil supporting core members of electrical machines. The invention will be described specifically in relation to this application.

Figure 1:
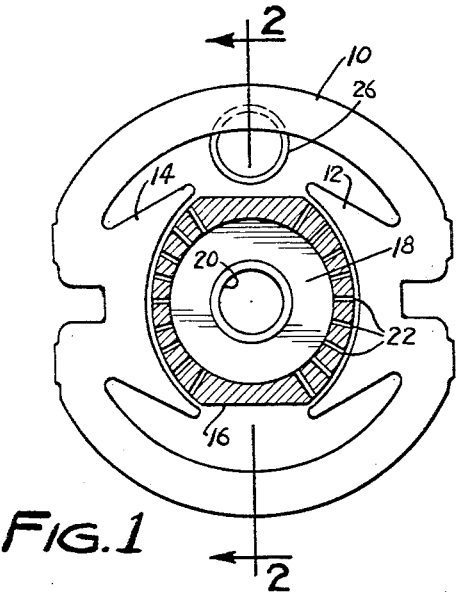
FIGURE 1 is a section view of a mandrel supporting a work piece shown in side elevation taken on the line 1—1 of FIGURE 2.

Referring first to FIGURE 1, the stator core 10 is shown in end elevation having opposed pole pieces 12 and 14. Loosely fitting between these pole pieces is the hollow mandrel 16. The looseness of the fit is exaggerated in order to show a clearance between the mandrel and the pole pieces. In actual practice, there is much less clearance between the mandrel and the pole pieces, the clearance being just enough to allow ready placement and removal of the work piece. Mandrel 16 has closed ends to produce an interior 18 and is fixed to a hollow shaft 20, the interior of hollow shaft 20 communicating with the interior of the mandrel. A series of perforations is shown at 22 in FIGURE 1 which permits the escape outwardly of any suitable gas such as air applied to the interior 18 of mandrel 16.

Turning now to FIGURE 2, the work piece or stator core 10 as seen in section supported on the mandrel body 16 with holes 22 forming a pattern that is covered by the pole piece. The pattern is formed by rows of perforations at each end of the mandrel and down the center of its curved portions that fit under pole pieces 12 and 14.

At 24 and 26 are shown fragments of nozzles through which powdered thermosetting resin may be introduced on to the work piece 10. These nozzles are not per se inventive and hence are shown in fragment only to illustrate their relation to a work piece on the mandrel.

When air is introduced via hollow shaft 20 to the interior 18 of mandrel 16, it flows outward through the holes or perforations 22 and causes a blanket of air to constantly be exhausted around the periphery of the pole pieces 12 and 14. Air thus exhausted from the interior 18 of mandrel 16 produces two effects. In the first place, it physically deflects particles of resin powder away from the edges of the pole pieces where it is not desirable to have the resin deposited to form a coating.

Not only does the air physically deflect powder away from areas where it is not desired to have it deposited, however, it is also expanding simply as the result of being released from compression. That is what is known as adiabatic expansion which is to say without transfer of heat energy. Since the air retains the same amount of heat that it had before its release, and it now, upon being released, occupies a greater space, the temperature per unit of space must go down which produces a cooling effect for both the surface of the mandrel and adjacent surfaces of the work piece. Since the thermosetting resin powder will adhere and become a coating only on material at a temperature above a critical one, this adiabatic expansion of the air lowers the temperature of the mandrel which it is desired to have at a relatively low temperature. This expansion cooling also assists in avoiding the accumulation of resin deposits on some parts of the work piece where it is not desired, in this case the edges of the pole pieces 12 and 14.

In FIGURE 3, a modified form of stator core 30 having a multitude of smaller teeth 32 is shown mounted on a mandrel 34 which communicates with a hollow shaft 36. In this case, since the center portion between the teeth is circular, some suitable means, secured to the mandrel, extends into the space between the teeth. As here shown this means is the pin 38. In the illustrated structure of FIGURE 3, this pin serves two purposes. In the first place, it assures that the work piece 30 will rotate with the mandrel 34 and secondly it aligns the two with respect to each other so that the holes or apertures 40 of mandrel 34 will align under the teeth 32 and thus produce substanianlly the identical effect as the pattern of teeth under the larger opposed pole pieces 12 and 14 in FIGURE 1. In FIGURE 4, a portion of the side of the mandrel nearest the teeth 32 is broken away to show how the holes 40 align directly with the tooth in which the reference number 32 with its lead line is applied. The holes designated 40A which align with the tooth 32A appear to be slightly off-center, but this is because they extend radially with respect to the mandrel and at their outer edge they center on to the tooth as may be observed in FIGURE 3.

In FIGURE 5 a work piece which may be either of the types shown at 30 in FIGURE 3 or 10 in FIGURE 1 but here designated 42 to distinguish it from the preceding work pieces is shown mounted on a mandrel 44 which is hollow providing a central cavity as shown by the broken lines 46. The surface of the mandrel is generally perforated as at 48 in a random manner as might be the case if it were made from a sintered material from which a portion is burned away in the sintering process leaving a porous body. This randomly porous mandrel is referred to as a generally perforated one which may be perforated in a patterned manner but overall as to produce the same functioning effect as this randomly porous unit. It is obvious from the disclosure of this random pattern, however, that a generally porous unit could be made even if by patterned perforations rather than randomly perforated. Accordingly patterned general perforation does not require specific description and illustration.

Fragmentary representations of resin powder depositing nozzles are shown at 50 and 52.

Mandrel 44 is supported on a hollow shaft 34 which in turn is shown secured to a rotary joint member 56 which with its mating counterpart 58 forms a rotary joint between the hollow shaft 34 and the hollow shaft 60. At 62 appears a suitable choke valve with a control 64 which allows the valve to offer greater or lesser resistance to the flow of air as desired. The conduit 66 extends therefrom to a suitable air pump represented diagrammatically at 68. Shaft 54 is rotated by any conventional means in a controlled manner while powder is being blown from nozzles 50 and 52 so that the entire stator structure is presented to the resin powder during the course of one revolution. While only two nozzles have been shown, it is obvious that greater numbers may be used.

The purpose of the choke valve 62 is to control the rate of air that is presented to the hollow mandrel. Obviously many different sizes of mandrels may be employed with a given powder spraying machine and a larger mandrel will require a greater volume of air in order to maintain the adiabatic expansion cooling arrangement desired. On the other hand, the smaller mandrel could, if presented with the volume of air used with the larger unit fail to produce adiabatic expansion. If the air is presented to the mandrel at the rate faster than it escapes, there will not be any expansion of the gas and hence no cooling effect or at least a reduced cooling effect.

The rotary joint 566–58 is of a conventional nature and is hence not described in greater detail here. Similarly, air pump 68 is of any suitable size and type for providing the amount of air pressure as is desired. Experience thus far suggests that about two pounds per square inch of air pressure is satisfactory.

It is apparent that many modifications and variations of this invention as hereinbefore set forth may be made without departing from the spirit and scope thereof. The specific embodiments described are given by way of example only and the invention is limited only by the terms of the appended claims.

What is claimed:

1. In a machine for coating selected portions of a work piece with thermosetting resin, said work piece having opposed portions from which coating is to be excluded, the combination of a mandrel adapted to be loosely fitting adjacent said opposed portions, said mandrel being hollow, a hollow shaft communicating with said hollow mandrel, perforations in said hollow mandrel, said perforations located in a pattern so that they are covered by said opposed portions of said work piece when the mandrel is fitted adjacent the opposed portions, and means on said mandrel engageable with said work piece to maintain the perforations in alignment with said opposed portions.

2. The structure of claim 1 in which said hollow mandrel has porous material providing said perforations.

3. A machine for coating a stator core having opposed pole pieces with a thermosetting resin comprising a mandrel adapted to loosely fit between the pole pieces of said stator core, said mandrel being hollow and having perforations, all of said perforations being covered by said pole pieces when said stator core is placed on said mandrel, means for maintaining the mandrel in alignment with the core whereby said perforations are always covered by said pole pieces when the mandrel is located between the pole pieces, a hollow shaft secured to and communicating with said hollow mandrel, means for directing thermosetting resin powder at the ends of said stator and means for applying air under pressure to said hollow shaft to cool the mandrel sufficiently to prevent resin from adhering to the mandrel.

4. The structure of claim 3 in which there is a rotary joint communicating between said hollow shaft and said means for applying air pressure and a choke valve preceding said rotary joint.

5. The structure of claim 3 in which said stator has a plurality of opposed pole pieces and said mandrel has a line of holes corresponding to each of said pole pieces.

6. The structure of claim 3 wherein said means for applying air under pressure supplies the air under pressure which allows adiabatic expansion of air as it leaves the mandrel.

References Cited

UNITED STATES PATENTS

| | | | |
|---|---|---|---|
| 2,038,592 | 4/1936 | Morris | 62—62 |
| 2,421,753 | 6/1947 | Joyce | 62—62 X |
| 2,587,075 | 2/1952 | Tice | 62—62 |
| 2,731,947 | 1/1956 | Harder | 118—500 |
| 2,910,962 | 11/1959 | Appleton | 118—500 |
| 3,111,431 | 11/1963 | Weaver | 118—408 X |
| 3,218,184 | 11/1965 | Lemelson | 117—21 X |
| 3,247,004 | 4/1966 | Dosser | 117—18 |

CHARLES A. WILLMUTH, *Primary Examiner.*

J. P. McINTOSH, *Assistant Examiner.*